United States Patent [19]

Fassauer

[11] 3,963,149
[45] June 15, 1976

[54] GRANULAR MATERIAL CONVEYOR
[75] Inventor: Arthur L. Fassauer, Canyon, Tex.
[73] Assignee: Fassauer Industries, Inc., Canyon, Tex.
[22] Filed: Jan. 31, 1975
[21] Appl. No.: 545,809

[52] U.S. Cl. .............................. 222/142; 198/168
[51] Int. Cl.² .............................................. B67D 5/52
[58] Field of Search ................ 222/144.5, 225, 415, 222/406, 342, 361, 365, 371, 386, 394, 137, 145, 142; 198/168, 172

[56] References Cited
UNITED STATES PATENTS

| | | | |
|---|---|---|---|
| 2,537,415 | 1/1951 | Loeb et al. | 222/361 X |
| 2,556,182 | 6/1951 | Hapman | 198/168 |
| 2,595,941 | 5/1952 | Hapman | 198/168 |
| 3,189,231 | 6/1965 | Kibbel, Jr. et al. | 222/386 X |
| 3,282,405 | 11/1966 | Larson et al. | 198/168 |
| 3,380,633 | 4/1968 | Du Bois | 222/137 |

*Primary Examiner*—Stanley H. Tollberg
*Attorney, Agent, or Firm*—Richards, Harris and Medlock

[57] ABSTRACT

The specification discloses a conveyor apparatus for combining programmed amounts of materials. The apparatus includes a conduit horizontally supported by a frame. The conduit has a plurality of inlet openings along the side for receiving the materials to be combined and a discharge orifice at one end for discharging the materials. A plurality of metering dispensers, each having a discharge opening, communicate with the inlet openings in the conduit in order to dispense a programmed amount of materials into the conduit. A cylindrical conveying piston is slidably positioned within the conduit, and moves along the conduit to move the materials within the conduit to the outlet orifice. The metering dispensers include a material sweep rotatably positioned at the bottom opening of a storage hopper. A distributor ring is positioned beneath the hopper opening and rotates with a cylindrical metering surface. Material is metered through the bottom opening in the storage hopper and then through the cylindrical metering surface by rotation of the distributor ring.

11 Claims, 12 Drawing Figures

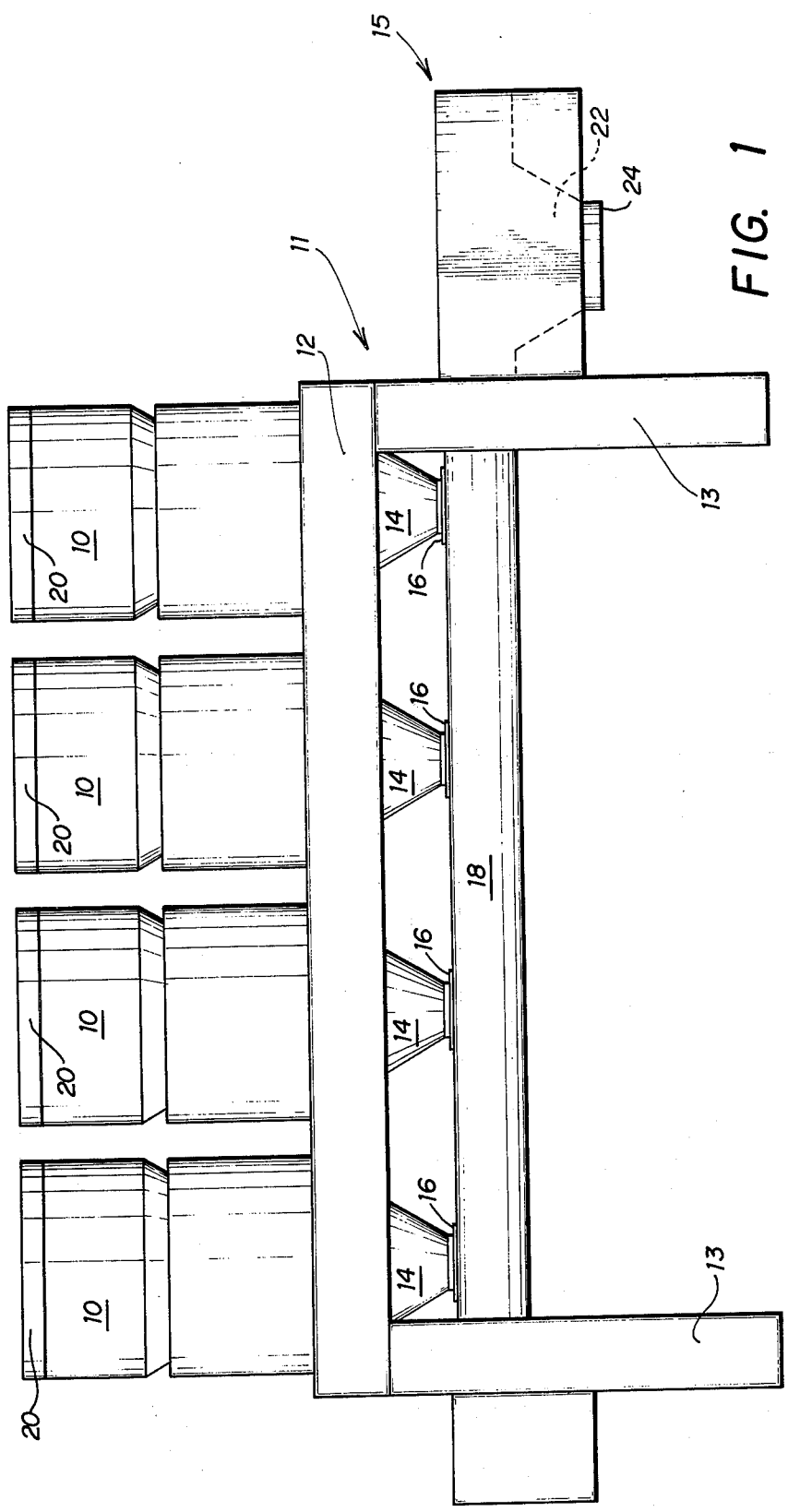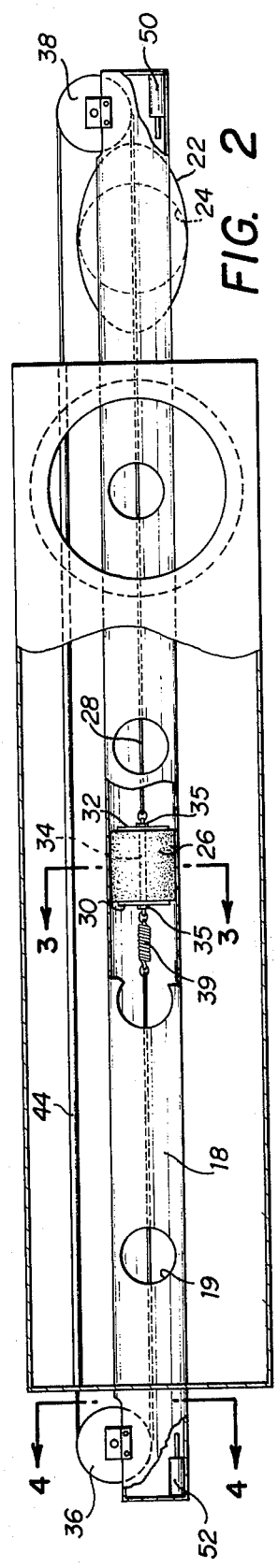

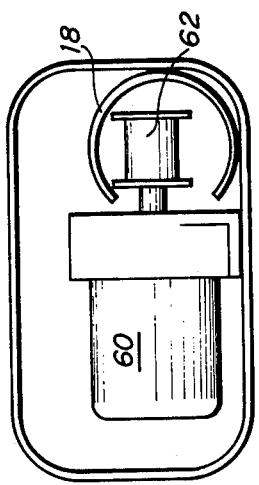
FIG. 5
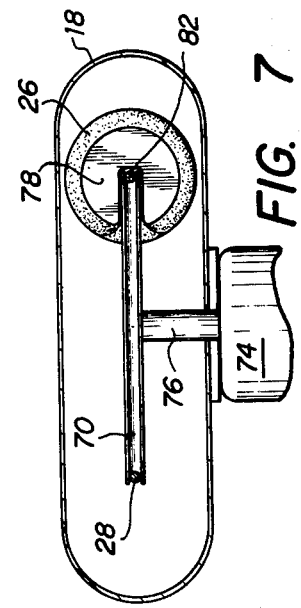
FIG. 7
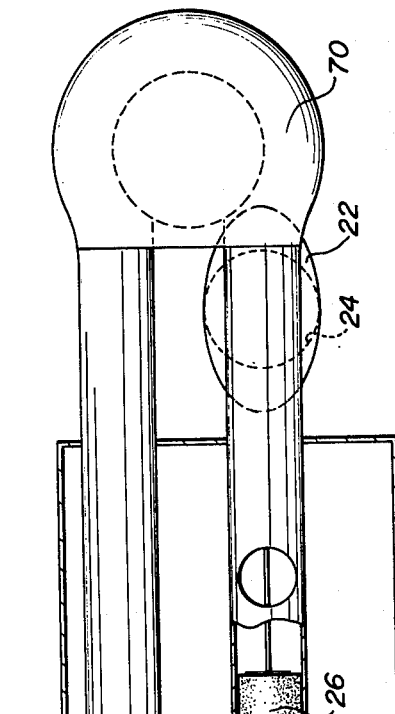
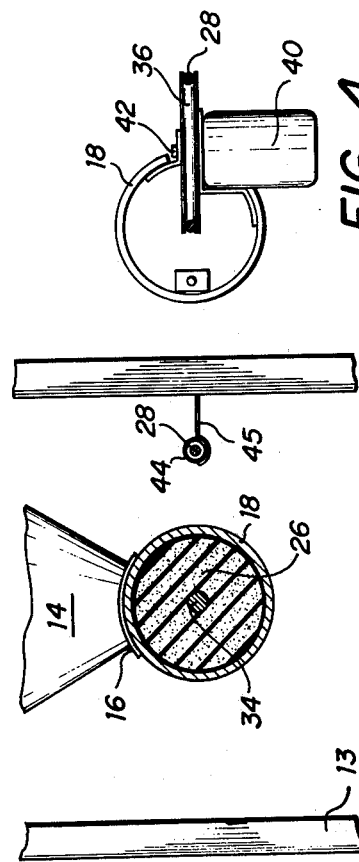
FIG. 4
FIG. 3
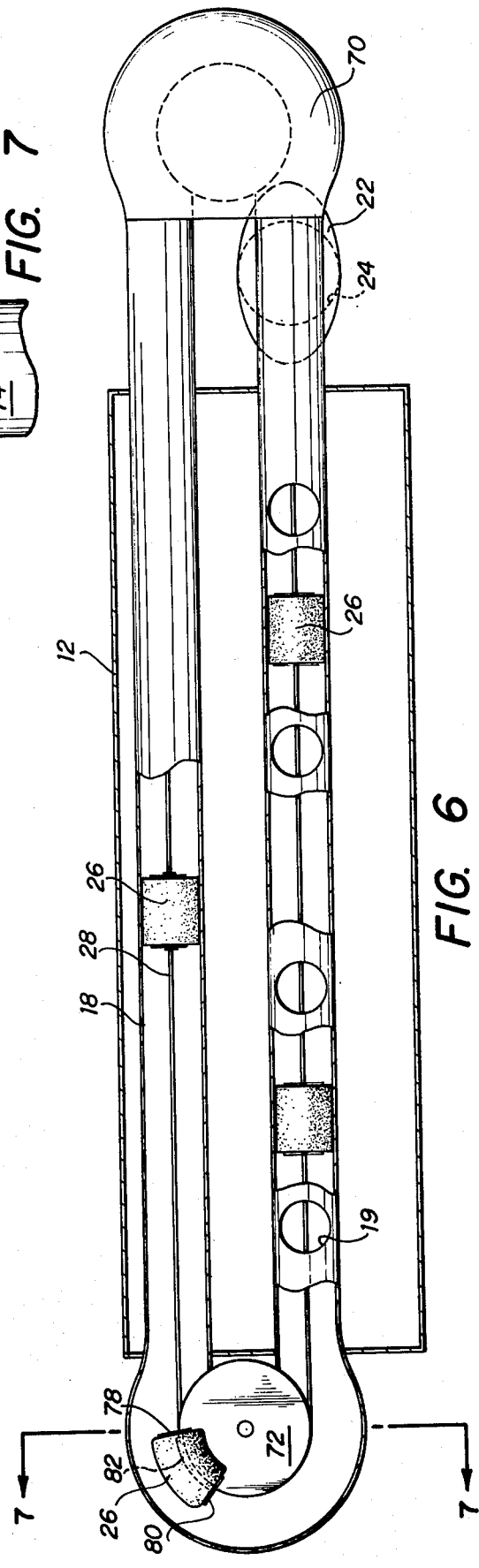
FIG. 6

GRANULAR MATERIAL CONVEYOR

BACKGROUND OF THE INVENTION

1. Field of the Invention

This invention relates to an apparatus for combining programmed amounts of materials, and more particularly to a conveyor system in which materials discharged from a metering device are combined and passed through the conveyor.

2. Prior Art

Because the majority of products sold today are a combination of ingredients which are mixed, packaged and sold as a finished product, the process of combining various components to form a complete mixture is used in numerous fields. In this process there is a need, however, for more than the ability to merely combine elements. The system used must be capable of accurately measuring the individual components prior to combining them as well as designed to repeat the combining sequence over a large number of cycles without any cross contamination between each individual combination.

The method of sequentially combining elements to form successive combinations of components has generally been by means of a screw auger conveyor adapted to accept the various components to make up the composition. Generally, a screw auger is housed within a conveyor shell and is rotated to carry the individual elements along the conveyor as they are deposited therein to a collecting point. With the removal of the components from the screw conveyor, additional elements to be combined are again deposited within the conveyor and the process is repeated sequentially for repeated mixing of a predetermined amount of each element.

Use of the screw auger as the conveyor means has presented several problems. A primary problem is the cross "contamination" of materials between successive combining procedures. Because of the clearances required between the extremities of the screw conveyor blade and the conveyor shell, materials being moved through the conveyor are not completely removed from the system prior to subsequent combining steps. Therefore, the material remaining in the conveyor shell from previous runs contaminates successive mixtures. Such contamination causes nonuniformity between the mixtures, and where biologically active materials are combined, the contamination by a small amount of another biologically active material would render the system unusuable.

Furthermore, most screw conveyors require substantial power to operate the auger and such power requirements increase substantially with any increase in the length of the conveyor used. The operation is by brute force of the turning screw auger against the material dispensed within the conveyor system. The friction in the system between the materials being moved through the conveyor and the walls of the conveyor add to power requirements necessary to drive the screw auger. Additionally, there is a tendency of material to jam between the outer extremity of the screw blade and the walls of the conveyor shell thereby increasing the force required to drive the system.

Metering of the components dispensed into the conveyor system is also of critical importance to an accurate combination of components. Most particulate material used as elements in combinations of materials are heterogenous in nature in that they are comprised of both large particles and smaller particles randomly dispersed in the mixture. The metering system used to dispense the components making up the final composition must have the capability of dispensing quantities having essentially the same mixture of coarser particles and more finely divided material so that the same mass of material is present in the two volumes.

To accomplish this result, the metering device must be capable of placing the material in a state of uniform compactness so that successive volumetric units metered from a quantity of material will contain the same mass and must be capable of handling the material prior to volumetric metering in a manner so that the random distribution of coarser and more finely divided material is not disturbed. The prior art metering and dispensing devices have generally employed vibration in order to feed material from a hopper to a dispensing mechanism. A major disadvantage of the use of vibration is that, while rendering masses more able to flow, it also causes the particulate material to stratify. That is, the more finely divided material moves to the lower layers resulting in a concentration of the larger particles in the upper layers.

SUMMARY OF THE INVENTION

The present invention substantially eliminates or reduces the problems heretofore encountered in material metering and conveying systems.

In accordance with one aspect of the invention, a series of the dispensing units are mounted along the conveyor system and adapted to dispense metered amounts of particulate matter into the conveyor system where the materials are collected and discharged from the conveyor means to a collecting area. The conveyor system has a conduit adapted to receive the materials dispensed from the dispensing apparatus. A cylindrical piston is fitted within the conduit for movement therethrough for removal of materials deposited within the conduit to a collecting station. Cords are attached to the circular faces of the piston and extend out of the ends of the conduit. Motors are provided for pulling the piston through the conduit by drawing one of the two cords through the conveyor system. The piston is then reset by drawing the piston in a reverse direction through the conduit and material is again metered into the conduit by the dispenser units communicating with the conduit.

In accordance with another aspect of the invention, a series of pistons are fitted within the conduit of the conveyor system and are interconnected by a cord. The pistons connected by the cord form a closed loop which is adapted for continuous movement through the conduit. The pistons are so positioned one from the other whereby a particular combination of particulate matter metered from the dispensing units may be deposited in the conduit and collected by the movement of the pistons through the conduit.

The piston may be constructed from open celled foam latex and the conduit from polyvinyl chloride or other non-conducting material. During the motion of the piston through the conduit, a strong electrostatic charge is created which repeals material within the conduit away from the inner walls thereby reducing friction between the piston and the conduit and assisting in the removal of materials from the conduit.

In accordance with another aspect of the invention, the dispensing apparatus is characterized by a distribution zone defined by a substantially horizontally disposed support surface and a metering surface extending upwardly from the support surface to a metering edge. A mound of particulate material is formed on the support surface adjacent the metering surface such that the natural angle of repose of the mound extends to a level in the plane in the metering surface which is above the metering edge. The mound of particulate material is moved along the metering surface so that particulate material from the mound flows over the metering edge under the action of gravity.

In accordance with still another aspect of the invention, the dispensing apparatus has a storage hopper having a bottom opening therein containing a mass of particulate material to be metered. A conical metering hopper is provided for collecting materials dispensed into the hopper. The wall of the metering hopper defines a central feeding opening at the bottom. A material sweep bar is rotatably mounted at the central feeding opening at the bottom of the metering hopper. A distributor ring is located beneath the central feeding opening in the metering hopper. The distributor ring comprises a circular substantially horizontally disposed particulate material support surface and a cylindrical metering surface extending around and upwardly from the support surface and having a plurality of port holes formed therethrough. A distributor blade is rotatably mounted within the distributor ring and includes at least one arm extending outwardly above the support surface and then upwardly adjacent the metering surface. The distributor blade and the material sweep are linked for conjoint rotation. A collecting hopper is located beneath the distributor ring.

The system further includes means for rotating the distributor blade, to move the material sweep within the metering hopper to fluidize the bottom unload particulate materials through the central feeding opening into the distributor ring, and to rotate the distributor blade and move a mound of particulate material along the metering surface of the distributor ring to allow a predetermined fraction of the mound to flow, by gravitation action, through the port holes in the metering surface into the collecting hopper.

BRIEF DESCRIPTION OF THE DRAWINGS

For a more complete understanding of the present invention, reference may now be had to the following description taken in conjunction with the accompanying drawings, in which:

FIG. 1 is a side elevation of the invention;

FIG. 2 is a section view taken along lines 2—2 of FIG. 1 which is partially cut away to show the conveyor conduit and piston fitted therein;

FIG. 3 is a section view taken along the lines 3—3 of FIG. 2;

FIG. 4 is a section view taken along lines 4—4 of FIG. 2;

FIG. 5 illustrates an alternate embodiment of the means for drawing the piston through the conveyor system;

FIG. 6 is a bottom view of an alternative embodiment of the conveyor system;

FIG. 7 is a section view taken along the lines 7—7 of FIG. 6;

DETAILED DESCRIPTION

Figure 8:
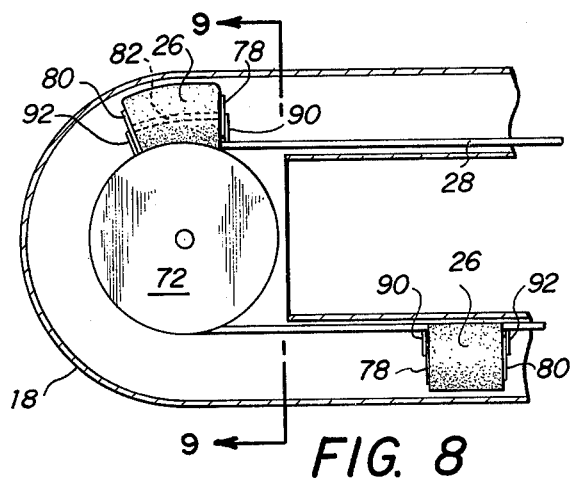
FIG. 8 is a partial bottom view of an alternative embodiment of the conveyor system used in the invention.

Referring to FIG. 1, there is shown a side view of the metering and conveyor apparatus. Metering dispenser units 10 are supported by frame 11 comprising a top member 12 and legs 13. Discharge hopper 14 extending from each metering dispenser 10 is joined to the conveyor apparatus 15 by sealing flange members 16. Metering dispensers 10 are fitted with removable caps 20. Conduit 18 is adapted at one end with a conically shaped discharge chute 22 forming outlet orifice 24.

Referring to FIG. 2, the conveyor apparatus 15 comprises a tube or conduit 18 containing a series of inlets 19 adapted to receive the output from discharge hopper 14 of metering apparatus 10. A piston 26 is adapted for slidable longitudinal movement within the conduit. As is best seen in FIGS. 2 and 3, piston 26 comprises a cylindrical body formed of open-celled foam latex. The piston body is firmly attached to and supported along its longitudinal axis by a threaded bolt 34 with nuts 35 to adjustably compress circular end plates 30 and 32 to expand the foam rubber piston radially for a gas-tight yet movable fit within the conduit.

Bolt 34 is operatively attached at each end thereof to an electrically insulated cord 28. The connection of the cord 28 to the bolt 34 forms an endless loop which is rotationally suspended between pulleys 36 and 38. Interconnected between one end of cord 28 and bolt 34 is spring 39 which keeps a constant tension on cord 28 and facilitates the removal of cord 28 from pulleys 36 and 38 when necessary. As can best be seen in FIGS. 2 and 4, pulley 36 is suspended from and driven by motor 40 through the rotation of shaft 42. In this embodiment, cord 28 is shielded as it passes outside of the conduit 18 by sleeve member 44 attached to frame legs 13 by support member 45.

In operation, the particulate matter to be combined is placed in the metering dispenser units 10 for discharge into conduit 18. With the piston 26 positioned at the end of conduit 18 remote from the outlet orifice 24, the particulate matter to be dispensed from the various dispensing units 10 is discharged into conduit 18 through the discharge hopper 14 of the dispensing apparatus through conduit inlet 19. The discharge of materials from the various dispensing units 10 may be controlled sequentially or the discharge may be simultaneous. Piston 26 is then drawn through conduit 18 by the activation of motor 46 (not shown) which rotates pulley 38, thereby drawing cord 28 and piston 26 through the conduit. As piston 26 passes each inlet 19, the metered material discharged into the conduit is cleaned from the conduit.

It has been discovered that during the motion of the piston along the conduit a strong electrostatic charge is developed on the wall of the conduit. This electrostatic charge causes the repulsion of the particulate material from the interior surface of the electrically nonconductive conduit wall as the piston moves through the conduit. The repulsion of the materials in the conduit from the interior walls is in part responsible for the ability of the piston to remove practically all traces of particulate material from the conduit.

The complete clean out of the conduit by a single sweep of the piston 26 assures the accuracy of the final combination commensurate to the accuracy of the metering dispenser units. Additionally, the repulsion of material from the side walls of the conduit 18 and the virtually total clean out of material from the conduit eliminates the problem of cross contamination between discharge cycles. Furthermore, as a result of this repulsion of material from the side wall of the conduit, the conveyed material exits the discharge opening in an extremely dispersed condition rather than being compressed as might be the case without this phenomenon.

After the piston has moved past each of the inlet openings 19 in the conduit 18 and past the discharge chute 22, the piston makes contact with microswitch 50. Microswitch 50 shuts off motor 46 and simultaneously activates motor 40 which causes the reverse movement of line 28 and piston 26 thereby reversing the travel of the piston. Piston 26 returns to the initial starting position, there making contact with microswitch 52 which shuts off motor 40. Microswitch 52 may either be programmed to activate motor 46 for beginning the cycle again, or an independent start switch for activating the initial step of the process may be used. Conventional circuitry (not shown) is employed to operate motors 40 and 46.

An alternative embodiment of the means for propelling the piston through the conduit is illustrated in FIG. 5. In this embodiment, motor 60 propels spindle or drum 62 to which cord 28 is attached. A similar motor and spindle 66 (not shown) are positioned at the opposite end of the conduit 18 from motor 60 and spindle 62.

In this embodiment, the cord 28 attached to piston 26 does not form a closed loop but instead has one end attached to spindle 62, with the other end attached to spindle 66. To draw the piston through the conduit, motor 60 is actuated thereby rotating spindle 62 and winding cord 28 thereon to draw the piston 26 through conduit 18. Contact of the piston with microswitch 50 shuts off motor 60 and activates motor 64 at the opposite end of the conduit 18 causing the rotation of spindle 66 thereby drawing cord 28 and piston 26 in the reverse direction through the conduit.

A second alternative embodiment of the method for propelling the conveyor piston 26 is illustrated in FIGS. 6 and 7. In this embodiment, a series of pistons 26 are connected by cord 28 to form a closed loop passing through conduit 18. In this embodiment, conduit 18 extends around the full length of the piston and cord system and serves as a shield for the piston throughout the course of its movement. The piston and cable system are propelled by enlarged pulleys 70 and 72. As is illustrated in FIG. 7, pulley 70 is propelled by motor 74 through the rotation of shaft 76.

As the pistons pass over the pulleys 70 and 72, the foam material from which the piston is constructed is compressed to allow the piston to travel around the pulleys. Circular end plates 78 and 80 are notched to allow the piston to ride over the pulley and assist in retaining the piston properly on the pulley as it passes therearound. The bolt 82 passing through the piston and interconnecting end plates 78 and 80 is preferably made of a flexible material to allow the piston to bend to the contour of the pulleys as it passes around them. In the area of pulleys 70 and 72, the conduit 18 is somewhat enlarged in diameter to allow additional room needed for the piston as it rides above the pulleys.

This arrangement of a series of pistons has several advantages over the first alternative embodiment. The rotation of the pulley and cord system is in a single direction thereby eliminating the need for control apparatus to reverse the direction of travel of the pulley system. Furthermore, the time required for resetting the piston to its start position as required in the first embodiment is eliminated, thereby increasing the speed of the system. While any spacing of pistons along the cord may be used, with the proper sequential discharge of material from the dispenser apparatus, the pistons may be set at intervals of as close as the distance between two adjacent dispensing units. In operation, the first dispenser may discharge materials just prior to the passage of a piston past first inlet 19 in the conduit and each succeeding dispenser may dispense the desired quantity of particulate material immediately prior to the passage of that piston past the inlet in the conduit. Each time a piston passes the first inlet, the dispensing cycle may be immediately repeated.

Figure 9:
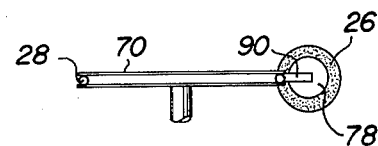
FIG. 9 is a section view taken along lines 9—9 of FIG. 8.

A third alternative for the arrangement of the pulley system used in the present invention is illustrated in FIGS. 8 and 9. In this embodiment, pistons 26 are attached near their outer circumference to cord 28 to form a closed loop rotatably mounted around pulleys 70 and 72. Members 90 and 92 extend from cord 28 and are attached to end plates 78 and 80 which are joined by flexible bolt member 82 which provides adjustable longitudinal compression of the piston 26. The attachment of the piston 26 at its outer circumference to cord 28 allows the piston to pass around the pulleys 70 and 72 without significantly compressing any of the foam material making up the piston. In this way, any wear experienced by the piston due to compression of the piston is eliminated. It should be noted, however, that while the cable is connected near the outer circumference of the piston, some of the foam making up the piston encircles the cable so that a complete sealing relationship is formed between the piston and the conduit.

Figure 11:
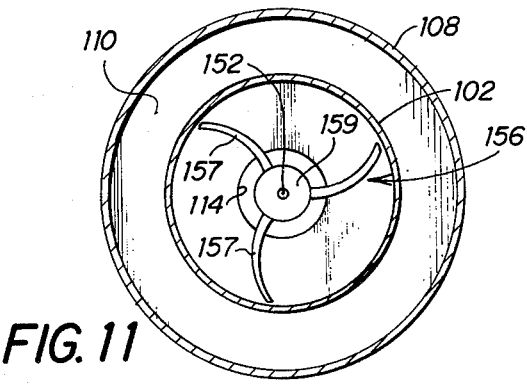
FIG. 11 is a section view taken along lines 11—11 of FIG. 10.
Figure 10:
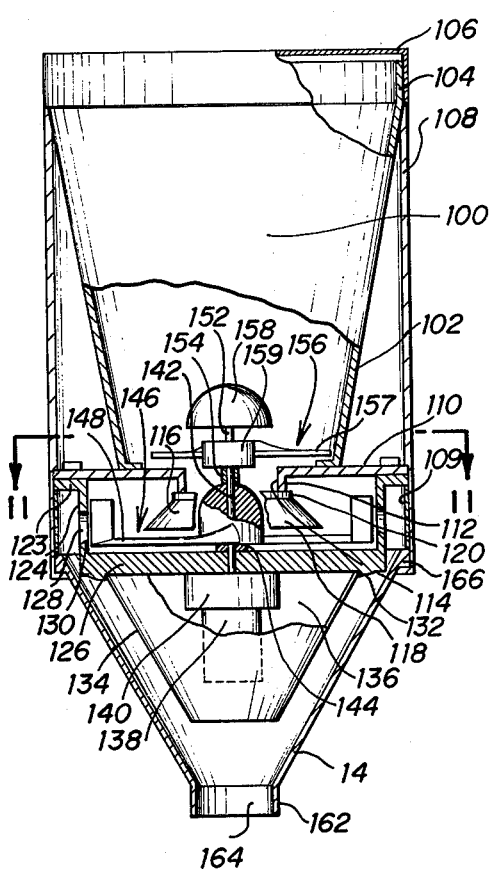
FIG. 10 is a partially cut away side view of one of the metering dispenser units used in the invention.
Figure 12:
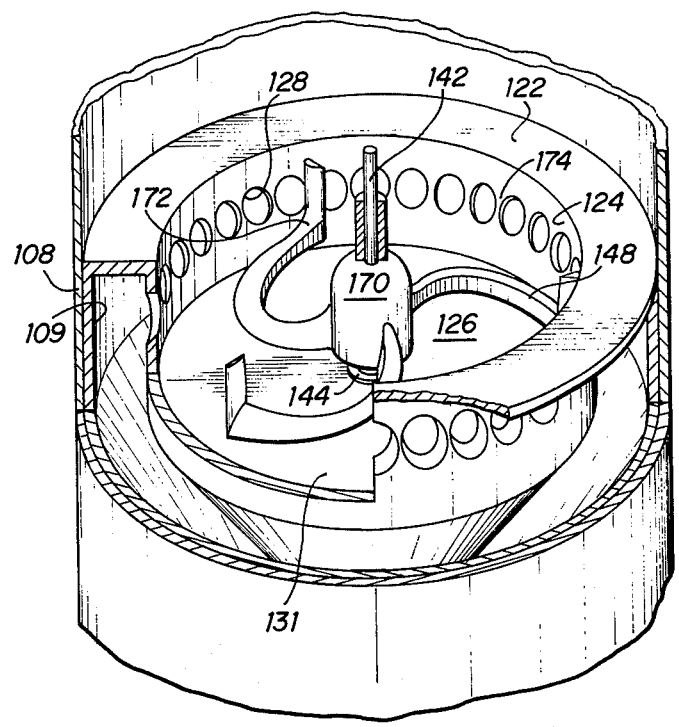
FIG. 12 is partially cut away perspective view of the distributor ring and metering surface used in the invention.

The metering dispenser unit used to accurately meter the particulate matter discharged into the conveyor system is illustrated in more detail in FIGS. 10, 11 and 12. Referring to FIG. 10, there is shown a partial longitudinal cross section view of the dispensing system. The system includes a metering hopper 100 comprising inwardly and downwardly extending conical walls 102. The metering hopper opening has cylindrical vertical walls 104 and is adapted to receive a cap member 106. The metering hopper is attached to and mounted within outer housing 108. The bottom portion of the conical walls of the metering hopper 100 are attached to a flat annular plate 110. Annular plate 110 has a cylindrical flange 112 which defines a central feeding opening 114. An adjustable screed ring 116 having a downwardly and outwardly flaring skirt portion 118 and a cylindrical section 120 is adjustably attached to cylindrical flange 112.

A distributor ring 122 is mounted beneath the screed ring 116. The distributor ring 122 is generally cylindrical with a vertically extending cylindrical wall 124 and a flat circular bottom 126. Annular flange 123 extends from wall 124 and is supported by a cylindrical spacer section 109. The distributor ring 122 includes a plurality of circular port holes 128 spaced about a central portion of the wall 124. The lower outer edges of the ports 128 include bevels 130 which provide the ports with sharp lower inner edges.

The lower surface of the distributor ring 122 includes an annular peripheral ridge 132 against the inside surface of which is mounted an enclosure 134 which forms a drive chamber 136 beneath the distributor ring 122. An electric motor 138 is mounted within the drive chamber 136 and is coupled through a speed reducer 140 to one end of a threaded output shaft 142.

The output shaft 142 passes through an opening in the bottom of distributor ring 122 and through a bushing 144 within the ring. A distributor blade 146, having a plurality of curved outwardly extending arms 148, is threadedly attached to the end of output shaft 142. The centrally extending drive shaft 152 is coupled to the end of shaft 142 by means of an internally threaded coupling sleeve 154. Mounted for rotation on shaft 152 is material sweep bar 156. As is best seen in FIG. 11, material sweep bar 156 includes a plurality of curved arms 157 extending outwardly from a hub 159. Arms 157 are slightly tapered in thickness and in height from the point of connection to hub 159 to the ends thereof. Mounted immediately above sweep bar 156, also on shaft 152, is pressure relief member 158.

As seen in FIG. 10, the outer surface of the wall 124 of the distributor ring 122 is spaced from the inner surface of the outer wall 108 so that particulate material passing through the distributor ring and out of the ports 128 will fall into collecting hopper 14. The walls of collecting hopper 14 are conical and include a flange 166 around the upper periphery which is supported between outer section 108 and the spacer section 109. The bottom portion of the collecting hopper 14 includes a short cylindrical outlet 162 which defines an outlet opening 164 to collect the particulate material metered through the system. The outlet section 162 is adapted to mate with flange 16 on inlet openings 19 in conduit 18 as seen in FIG. 1.

As is best seen in FIGS. 10 and 11, the first metering action occurs at the sweep bar 156 which relieves the compacting pressure on the particulate material introduced into hopper 100. Material introduced into hopper 100 settles at the bottom opening thereof. Pressure member 158, approximately equal in diameter to the opening formed in the bottom of hopper 100 by annular plate 110, relieves pressure on the material which is directly over the outlet of hopper 100. Sweep bar 156 comprises a constant width member tapering in height from its midsection to its outer end. The rotation of the sweep bar 156 relieves the compacting pressure on the particulate material by aerating and fluidizing it while feeding particulate material through the opening in annular plate 110 onto the distributor ring. The pressure relief member 158 functions to support the weight of the material in the hopper above the opening to the distributor ring and to relieve pressure thereon. This pressure release serves to reduce the pressure on the material to be metered.

Referring to FIG. 10, the adjustable screed ring 116 is positioned surrounding the opening in horizontal annular plate 110 just above the arms 148 of the distributor blade 146.

The function of the outwardly flaring skirt portion 118 of the ring 116 is to resist the tendency of the particulate material to spread out as the angle of repose after passing through the opening 114. The screed ring 116 shapes the outflow of material from the metering hopper 100 by choking the outwardly directed movement of the particles. The vertical position of the bottom edge of the screed ring 116 is adjustable in order to change the rate of flow material from the metering hopper 100 into the distributor ring 122.

In effect, the screed ring 116 measures out material from the metering hopper 100 while the arms 148 of the distributor blade 146 measure material from within the screed ring 116 outwardly into the distributor ring 122. The screed ring 116 feeds particulate material into the distributor ring 122 only as it is required by the arms 148, which is in direct proportion to the speed of rotation of the distributor blade 146. For a more detailed explanation of the position of the screed ring with respect to a metering device, reference is now made to U.S. Pat. No. 3,804,303.

Referring now to the partially cut away perspective view of the distributor ring 122 shown in FIG. 12, the circular bottom surface of the distributor ring 122 is covered with a layer of abrasive material 131 to prevent the entire mass of material contained within the distributor ring from moving in a circle by sliding on the bottom surface. In one embodiment, the material used for layer 131 was safety walk paper, type B, medium grid, manufactured by the Minnesota Mining & Mfg. Company.

The distributor blade 146 includes a spindle portion 170 which is threadedly attached to the output shaft 142 above the bushing 144. The bottom edges of the distributor blade arms 148 are spaced from the surface of the abrasive material 131 to allow small foreign objects which might be within the material to be metered, to sink to the bottom and prevent damage to the port holes 128. The distributor blade 146 is positioned within the distributor ring 122 so that the tops of the fillets 172 near the ends of the arms 148 are located at approximately the bottom edges of the port holes 128.

As shown in FIG. 12, the port holes 128 are spaced from one another so that the fillets 174 between the port holes 128 are relatively narrow to give good repeatability of flow from the hole when the distributor blade 146 is started and stopped at various positions around the distributor ring 122. The lower edges of the outside portion of the port holes 128 are formed with bevels 130 so that the lower insides of the hole (looking out) include a sharp, knife-like lower edge. The bevels 130 prevent the accumulation of particles of material within the holes 128 and thereby avoid metering inaccuracy due to material dribble from the holes after motion of the distributor blade 146 has stopped.

The number and size of holes 128 are proportional to the diameter of the distributor ring being employed. In one embodiment, for example, a distributor ring having an inside diameter of 12 inches successively employed port holes having a diameter of about 27/32 inch. For various distributor blades which may be successfully used in the present apparatus, reference is here made to U.S. Pat. No. 3,804,303, where several alternate embodiments of distributor blades are described. Reference is also made to U.S. Pat. No. 3,804,303 for a more detailed explanation of the movement of the particles comprising the mass of particulate material as the distributor blade 146 moves orbitally about the distributor ring 122.

Referring first to FIG. 10, the system operates as follows: A quantity of particulate material to be metered into the conveyor system is placed in the hopper 100. When the material is added, a portion of the weight of the material is supported by pressure member 158 while materials flow around sweep bar 156 and onto annular member 110 and the opening 114 therethrough. When the motor 138 is energized, rotation of the output shaft 142 rotates the sweep bar 156. Rotation of bar 156 moves particulate material downwardly out of the metering hopper through the central feeding opening 114, through the screed ring 116, and to the distributor ring 122.

When the system is being initially charged with material, the particles flow into the distributor ring 122 to the top of the skirt portion 118 of the screed ring 116. As the distributor blade arms 148 rotate about the distributor ring 122, they move material from within the screed ring 116 and distribute it about the distributor ring 122. Particulate material is moved from beneath the screed ring 116 by the rotating arms 148 of the distributor blade 146. In general, the arms 148 of the distributor blade aerate and fluidize the particulate material and move uncompacted material out through the port holes 128 into the collecting hopper 14, at a highly accurate, constant mass flow per unit of time.

The material metered from discharge opening 164 of collecting hopper 14 is dispensed into conduit 18. The quantity of material dispensed is controlled by controlling the time of operation of the dispensing apparatus as well as the particular distributor blade employed. After the required amount of particulate material is dispensed into conduit 18 by the several metering dispenser units attached to the conduit, or during the sequential dispensing of material into the conduit, motor 46 is activated thereby causing the rotation of pulley 38. The rotation of pulley 38 causes the movement of piston 26, which has been initially positioned to the end of the conduit opposite the discharge opening 24. As the piston is drawn through the conduit 18, the contact of the foam piston 26 and the polyvinyl chloride conduit 18 creates an electrostatic charge which repels the particulate material from the side wall of the conduit thereby facilitating the movement of the piston and the removal of the particulate material therefrom. The material metered into the conduit by the several dispenser units is therefore cleaned from the conduit and deposited out of discharge orifice 24. As the piston reaches the end of conduit 18, it makes contact with microswitch 50 thereby shutting off motor 46 and activating motor 40. Motor 40 rotates pulley 36 in a direction opposite that of pulley 38 thereby drawing the piston in a reverse direction through the conduit to its starting position. The cycle is then repeated with identical or varying amounts of individual components being dispensed from the various dispensing units.

In the alternative embodiment having the series of pistons interconnected in a closed loop, the movement of the pistons around the course is in a single direction. Particulate material is sequentially deposited into the conduit so that the components to be combined are dispensed immediately prior to the movement of the piston 26 past the conduit inlet 19.

While the present material metering and conveying system may be used in numerous areas, the system will find particular use where particular quantities of various ingredients must be accurately dispensed and combined repeatedly over a number of cycles. Such a requirement is found in the commercial preparation of food as where the ingredients of a recipe are placed in the dispenser units and the dispenser controls programmed to discharge the required amounts of each component for combining by the conveyor unit. Similar application of the present system is found in the production of paints and other commercial products requiring the combination of components to form the finished product.

Therefore, it may be seen that the present invention provides a means for accurately dispensing materials into a conveyor system whereby the materials are removed from the system with little or no cross contamination resulting therefrom. Due to the electrostatic charge created by the use of non-conducting conduit material and foam latex pistons which repel the particulate material from the side wall of the conveyor conduit as the piston passes therethrough, friction is substantially reduced while achieving a complete clean out of the conduit during each pass made by the pistons. Additionally, it has been found that the reduction of friction between the piston and the conduit greatly reduces the horsepower necessary to drive the system. In contrast, the systems used in the past have lacked the ability to completely clean the conveyor system and have required increasing horsepower with any corresponding increase in the length of the conveyor system due to the friction factor.

Having described the invention in connection with certain specific embodiments thereof, it is to be understood that further modifications may now suggest themselves to those skilled in the art and it is intended to cover such modifications as fall within the scope of the appended claims.

What is claimed is:

1. An apparatus for combining programmed amounts of different materials comprising:

a tube member adapted to receive the different materials to be combined, said tube member having an opening for receiving each different material and at least one opening for discharging the materials;

at least one metering dispensers each housing a different material and having a discharge opening for transmitting the material contained therein into said tube member;

a piston fitted within said tube member having an outer contour substantially conforming to the inner contour of said tube member;

a first line having one end attached to said piston and the other end attached to a first means for drawing said first line whereby said piston is moved within said tube toward said first drawing means;

a second line having one end attached to said piston and the other end attached to a second means for drawing said second line toward said second drawing means, said second drawing means being at the opposite end of said tube member from said first drawing means whereby said piston may be reciprocated within said tube member by alternately activating said first and said second drawing means; and means for selectively operating said metering dispensers to dispense a preselected amount of each different material into said tube member ahead of the movement of said piston such that said different materials deposited within said tube member are combined and removed from said tube member.

2. The apparatus of claim 1 wherein said first and second drawing means each comprise:

a motor having a shaft rotated thereby; and a spindle attached to said shaft and adapted to receive said line whereby said line may be drawn in by the rotation of said spindle.

3. An apparatus for combining programmed amounts of different materials comprising:
- a tube member adapted to receive the different materials to be combined, said tube member having an opening for receiving each different material and at least one opening for discharging the materials;
- at least two metering dispensers each housing a different material and having a discharge opening for transmitting the material contained therein into said tube member;
- a piston fitted within said tube member having an outer contour substantially conforming to the inner contour of said tube member;
- means attached to said piston for moving said piston longitudinally within said tube member; and
- means for selectively operating said metering dispensers to dispense a preselected amount of each different material into said tube member ahead of the movement of said piston such that said different materials deposited within said tube member are combined and removed from said tube member; wherein said tube member comprises a plastic conduit and wherein said piston comprises a compressible elastomeric cylindrical plunger having means for attachment to opposite ends of said plunger and for compressing said plunger such that said plunger may be compressed longitudinally and thereby expanded radially to effect proper contact with said conduit whereby movement of said plunger within said conduit generates an electrostatic charge on the wall of said conduit for repulsion of the material from the wall of said conduit thereby facilitating removal of the materials therefrom.

4. An apparatus for combining programmed amounts of materials comprising:
- a frame;
- a tubular member horizontally supported by said frame and having a plurality of inlet openings therein for receiving the materials to be combined and at least one discharge orifice for discharging the materials;
- a plurality of metering dispensers each having a discharge opening therein communicating with the inlet openings in said tubular member and each adapted to dispense a programmed amount of material into said tubular member;
- a conveying piston means slidably positioned within said tubular member and having an outside contour substantially conforming to the inside contour of said tubular member;
- a mixing container having an opening therein communicating with the outlet orifice in said tubular member; and
- means for reciprocating said piston means within said conduit means, said reciprocating means including a first line having one end attached to said piston and the other end attached to a first winding drum; first motor means for driving the first winding drum and thereby drawing said first line and said piston through said tubular member whereby the materials deposited in said tubular member are carried to the outlet orifice in said tubular member; a second line having one end attached to said piston and the other end attached to a second winding drum located on the opposite end of said tubular member from the first drum; and second motor means for driving the second winding drum and thereby drawing said second line and said piston in a reverse direction through said tubular member.

5. An apparatus for combining programmed amounts of materials comprising:
- a frame;
- a tubular member horizontally supported by said frame and having a plurality of inlet openings therein for receiving the materials to be combined and at least one discharge orifice for discharging the materials;
- a plurality of metering dispensers each having a discharge opening therein communicating with the inlet openings in said tubular member and each adapted to dispense a programmed amount of material into said tubular member;
- a conveying piston means slidably positioned within said tubular member and having an outside contour substantially conforming to the inside contour of said tubular member, said piston means including a plurality of conveying pistons fitted within said tubular member;
- a mixing container having an opening therein communicating with the outlet orifice in said tubular member; and
- means for reciprocating said piston means within said conduit means, said reciprocating means including an endless line interconnecting said pistons, said line being mounted for movement around a course defined by at least two pulleys, with one pulley mounted at each end of said tubular member, and motor means for moving said pistons around said course thereby removing the programmed material from said tubular member.

6. A system for metering particulate materials, comprising:
- a storage hopper for containing a mass of the materials, said hopper having a bottom opening therein;
- a bottom unloading material sweep positioned in the bottom opening in said hopper, said sweep including a plurality of curved outwardly extending arms mounted for rotation about a vertical axis;
- a pressure member mounted above said unloading sweep;
- a circular platform positioned below said unloading sweep, said platform having an opening therein to allow passage of material therethrough;
- a distributor ring located beneath the opening in said platform, said distributor ring comprising a circular substantially horizontally disposed particulate material support surface and a cylindrical metering surface extending around and upwardly from the surface and having a plurality of port holes formed therethrough;
- a material screed attached to said platform and having an opening corresponding to the opening in said platform, said screed having walls tapering downwardly and outwardly to allow the materials to flow through the opening in said platform and onto said distributor ring;
- a distributor blade rotatably mounted with said distributor ring and having at least one arm extending outwardly above the support surface and then upwardly adjacent the metering surface.

7. A system for metering particulate matter as set forth in claim 6 wherein the distributor blade includes at least three arms equally spaced about the blade from one another.

8. A system for metering particulate material as set forth in claim 7 wherein each arm of the distributor blade comprises:
   an airfoil like leading edge to get beneath particulate material and pass the material across the upper surface thereof as the arm is moved;
   a flat vertically extending trailing edge to permit particulate material passing across the surface of the blade to fall freely back to the material support surface, thereby aerating and fluidizing the material; and
   a rounded fillet between the outwardly and upwardly extending portions for allowing a portion of the mound to flow over the arm and thereby form a mound having a fixed geometric shape.

9. A system for metering particulate material as set forth in claim 6 and further comprising:
   a collecting hopper located beneath said distributor ring, said hopper having conical walls tapering downwardly and inwardly to define a discharge opening out of the system at the bottom thereof.

10. A system for metering particulate material as set forth in claim 9 and further comprising:
    means for rotating said unloading sweep to fluidize and bottom unload particulate material from said storage hopper through the opening in said circular platform and onto said distributor ring; and
    means for rotating said distributor blade in a direction opposite the direction of rotation of said unloading sweep to move a mound of particulate material along the metering surface of said distributor ring to allow a predetermined fraction of the mound to flow, by gravitation action, through the port holes in the metering surface into said collecting hopper.

11. An apparatus for combining programmed amounts of materials comprising:
    a tube member adapted to receive the materials to be combined having at least two openings for receiving the materials and at least one opening for discharging the materials;
    at least two metering dispensers each having a discharge opening for transmitting the material contained therein into said tube member, said metering dispenser having a storage hopper for containing a mass of the materials, said hopper having a bottom opening therein; a bottom unloading material sweep positioned in the bottom opening in said hopper, said sweep including a plurality of curved outwardly extending arms mounted for rotation about a vertical axis; a pressure member mounted above said unloading sweep; a circular platform positioned below said unloading sweep, said platform having an opening therein to allow passage of material therethrough; a distributor ring located beneath the opening in said platform, said distributor ring comprising a circular substantially horizontally disposed particulate material support surface and a cylindrical metering surface extending around and upwardly from the surface and having a plurality of port holes formed therethrough; a material screed attached to said platform and having an opening corresponding to the opening in said platform, said screed having walls tapering downwardly and outwardly to allow the materials to flow through the opening in said platform and onto said distributor ring; a distributor blade rotatably mounted with said distributor ring and having at least one arm extending outwardly above the support surface and then upwardly adjacent the metering surface;
    a piston fitted within said tube member having an outer contour substantially conforming to the inner contour of said tube member;
    means attached to said piston for moving said piston longitudinallly within said tube member to remove the materials from said tube member by the movement of said piston.

* * * * *

UNITED STATES PATENT OFFICE
CERTIFICATE OF CORRECTION

Patent No. 3,963,149  Dated June 15, 1976

Inventor(s) Arthur L. Fassauer

It is certified that error appears in the above-identified patent and that said Letters Patent are hereby corrected as shown below:

Col. 3, line 36, "to fluidize the" should be --to fluidize and--.

Col. 10, line 37, "one" should be --two--.

Signed and Sealed this

Seventeenth Day of August 1976

[SEAL]

Attest:

RUTH C. MASON
Attesting Officer

C. MARSHALL DANN
Commissioner of Patents and Trademarks